United States Patent Office 3,260,769
Patented July 12, 1966

3,260,769
PRODUCTION OF OLEFINES FROM ALKYL BORATES
Dennis Marshall, Norton-on-Tees, England, assignor to Imperial Chemical Industries Limited, London, England, a corporation of Great Britain
No Drawing. Filed Sept. 22, 1965, Ser. No. 489,390
Claims priority, application Great Britain, Oct. 6, 1964, 40,723/64
12 Claims. (Cl. 260—682)

This invention relates to the production of olefines and in particular to the production of olefines by the decomposition of alkyl borates.

It is known that certain alkyl borates can be decomposed at elevated temperatures and that the decomposition products may contain olefines.

We have now found that this decomposition reaction may be considerably facilitated by carrying it out in the presence of a catalyst and that the yield of olefine is thereby much increased. The use of a catalyst enables alkyl borates which are only decomposed to an olefine with difficulty or not at all, to be easily decomposed.

According to the invention therefore there is provided a process for the production of olefines which comprises bringing an alkyl or cycloalkyl borate into contact at elevated temperature with a solid catalyst.

A wide variety of catalysts may be used particularly those which are known to be effective as hydrogenation/dehydrogenation, hydration/dehydration or hydrocarbon cracking catalysts. Thus, the catalyst may comprise alumina, silica/alumina or fluoride-modified silica/alumina, a compound of a metal of Groups 2, 3, 4 and 6 of the Periodic Table such as copper, zinc, aluminium, chromium, tungsten or thorium, for example, copper oxide, zinc oxide, aluminium phosphate, chromia, copper chromate, zinc chromate, thoria, tungstic oxide or tungsten sulphide. Especially suitable catalysts are acid-type catalysts such as tungstic oxide, tungsten sulphide, alumina, silica/alumina, thoria and aluminium phosphate. It is preferred that the catalyst comprises a compound of tungsten or thorium for example, tungsten oxide, tungsten sulphide or thoria.

The catalyst may be a supported catalyst. A wide variety of supports may be used. A very suitable support is alumina.

It is preferred that the catalyst has a surface area of at least 5 square metres per gram.

The process of the invention is applicable to the decomposition of a wide range of alkyl borates and the alkyl group may be a straight chain group, a branched chain group or a cycloalkyl group. The process of the invention is particularly applicable to the decomposition of alkyl borates in which the alkyl group is a lower alkyl group, particularly an alkyl group containing at most 8 carbon atoms.

The borate ester is preferably an orthoborate or a metaborate but a borate intermediate in composition between an ortho- and meta-borate or a borate having a higher boron content than the metaborate may be employed.

The alkyl borate may be decomposed in the liquid or vapour phase or in solution in a suitable solvent. Desirably the solvent is a high boiling solvent which is liquid and which does not decompose under the conditions of the process. When the borate is decomposed in the vapour phase a very suitable catalyst is a silica/alumina hydrocarbon cracking catalyst.

The most satisfactory decomposition temperature depends on the particular alkyl borate to be decomposed. Suitable temperatures are usually within the range 150° to 350° C.

*Example 1*

100 grams n-octyl-2-orthoborate were heated in a distillation apparatus under atmospheric pressure in the presence of 10 ml. of a catalyst and the distillate condensed and collected. The catalyst used, the temperature and the composition of the distillate are given in the following table:

| Catalyst | Surface area, m.²/gram | Boiler Temp., °C. | Distillation Temp., °C. | Composition of distillate, mol. percent | |
|---|---|---|---|---|---|
| | | | | Octenes | Octanol-2 |
| Tungstic oxide | 20 | 172-194 | 100-108 | 92 | 8 |
| Tungstic oxide on titania | 40 | 158-182 | 78-110 | 94 | 6 |
| Tungsten sulphide | | 150-168 | 80-118 | 98 | 2 |
| Iron fluoride on silica alumina | | 182-208 | 90-110 | 89 | 11 |
| γ-Alumina | 100 | 184-226 | 100-150 | 69 | 31 |
| Silica/alumina | 230 | 200-240 | 126-150 | 77 | 23 |
| Thoria | 30 | 204-234 | 100-134 | 85 | 15 |
| Aluminium phosphate | | 187-204 | 110-116 | 86 | 14 |
| Copper chromate | | 180-236 | 106-136 | 81 | 19 |
| Zinc oxide | | 202-284 | 146-210 | 73 | 27 |
| Copper oxide/zinc oxide | 30 | 218-244 | 108-134 | 63 | 37 |
| Chromia on alumina | | 248-300 | 160-220 | 53 | 47 |
| Zinc chromate | | 244-306 | 140-164 | 57 | 43 |

In the absence of a catalyst n-octyl-2-orthoborate did not decompose at a boiler temperature of 250° to 300° C.

*Example 2*

100 grams n-pentyl-1-metaborate were heated at 220° C. to 300° C. with 10 ml. of a silica-alumina cracking catalyst having a surface area of 230 square metres/gram. A distillate was obtained consisting of 60% pentenes and 40% pentanol-1.

At 300 to 330° C. in the absence of a catalyst some decomposition occurred but most of the metaborate was converted into the more volatile orthoborate which distilled unchanged.

*Example 3*

N-pentyl-1-orthoborate was vaporised and the vapour passed through a tube packed with a silica/alumina cracking catalyst having a surface area of 230 square metres/gram. The tube was heated to a temperature of 325° C. and the residence time of the vapour in contact with the catalyst was one minute. Substantially complete decomposition of the borate ester was achieved with a 76% yield of pentenes.

When the cracking catalyst was replaced by silica chips no decomposition of the ester was observed at a temperature of 450° C. and a residence time of three minutes.

*Example 4*

50 grams 4-methylpentyl-2-orthoborate were heated at 200° C. to 280° C. with 1.8 grams of a silica-alumina catalyst having a surface area of 230 square metres/gram. A distillate was obtained consisting of 74% methylpentenes and 26% 4-methylpentanol-2.

At 290° C. in the absence of a catalyst the ester began to distill without decomposition.

I claim:

1. A process for the production of olefines in which an alkyl or cycloalkyl borate is brought into contact at elevated temperature with a catalyst selected from the group consisting of hydrogenation/dehydrogenation, hydration/dehydration and hydrocarbon cracking catalysts.

2. A process as claimed in claim 1 in which the catast has a surface area of at least 5 square metres per am.

3. A process as claimed in claim 2 in which the catalyst is selected from the group consisting of tungstic oxide, tungsten sulphide, alumina, alumina/silica, thoria and aluminium phosphate.

4. A process as claimed in claim 2 in which the catalyst is selected from the group consisting of tungstic oxide, tungsten sulphide and thoria.

5. A process as claimed in claim 1 in which the alkyl group contains at most 8 carbon atoms.

6. A process as claimed in claim 1 in which the borate is selected from the group consisting of orthoborates and metaborates.

7. A process as claimed in claim 1 in which the borate is in the liquid phase.

8. A process as claimed in claim 1 in which the borate is in the vapour phase.

9. A process as claimed in claim 8 in which the catalyst comprises alumina/silica.

10. A process as claimed in claim 1 in which the temperature is within the range 150° C. to 350° C.

11. A process for the production of olefines in which an alkyl borate R.B. where R is an alkyl or cycloalkyl group containing at most 8 carbon atoms and B is an orthoborate or metaborate group is brought into contact at a temperature within the range 150° C. to 350° C. with a catalyst selected from the group consisting of hydrogenation/dehydrogenation, hydration/dehydration and hydrocarbon cracking catalysts.

12. A process as claimed in 11 in which the catalyst is selected from the group consisting of tungstic oxide, tungsten sulphide, alumina, alumina/silica, thoria and aluminium phosphate.

References Cited by the Examiner

Steinberg, "Organoboron Chemistry," Wiley, New York, 1964, pp. 118–122.

DELBERT E. GANTZ, *Primary Examiner.*

G. E. SCHMITKONS, *Assistant Examiner.*